UNITED STATES PATENT OFFICE.

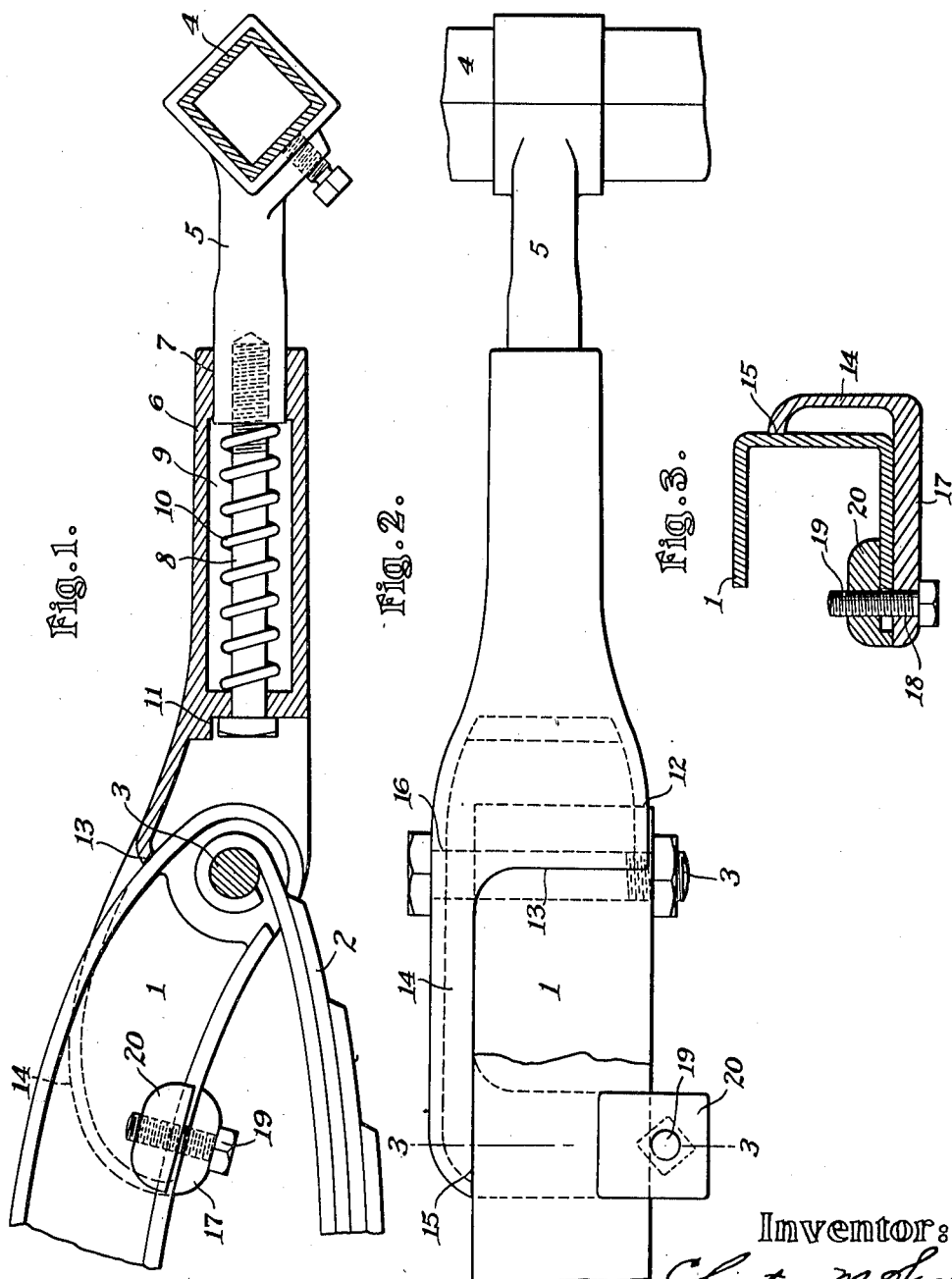

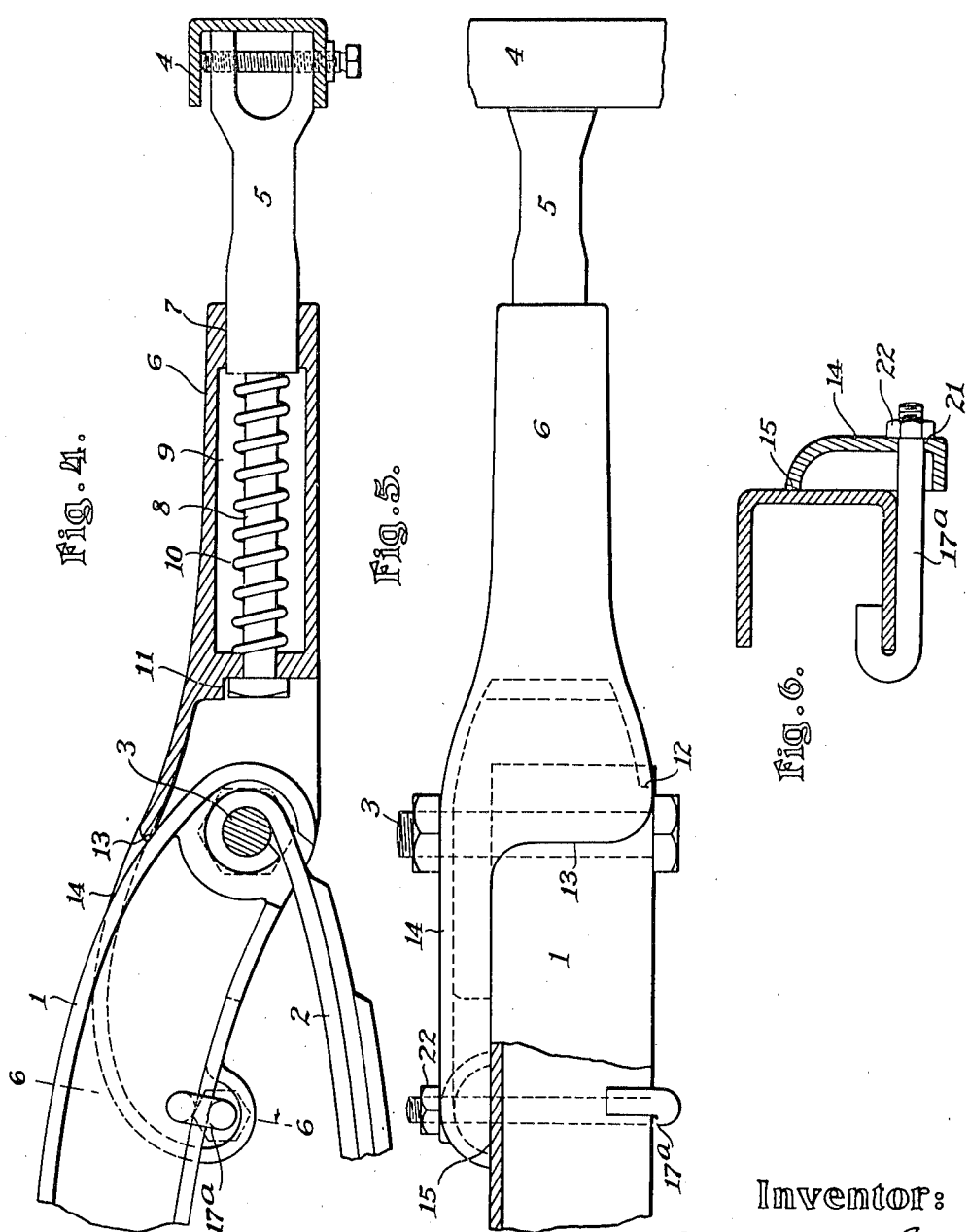

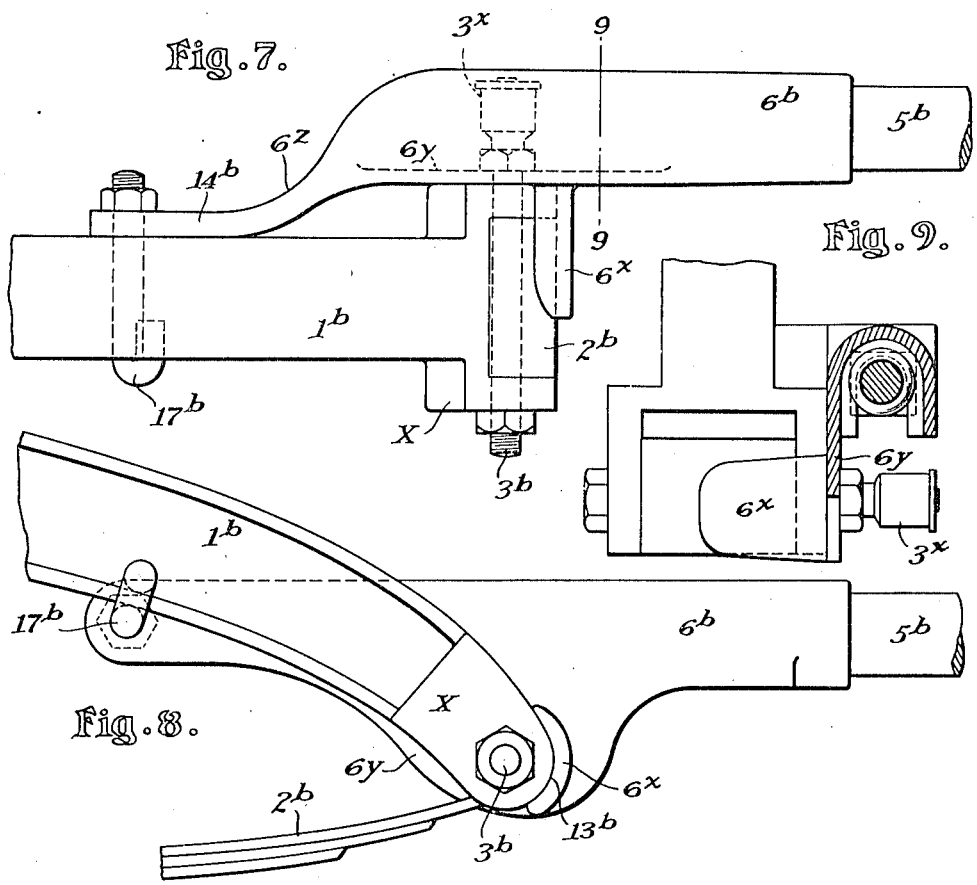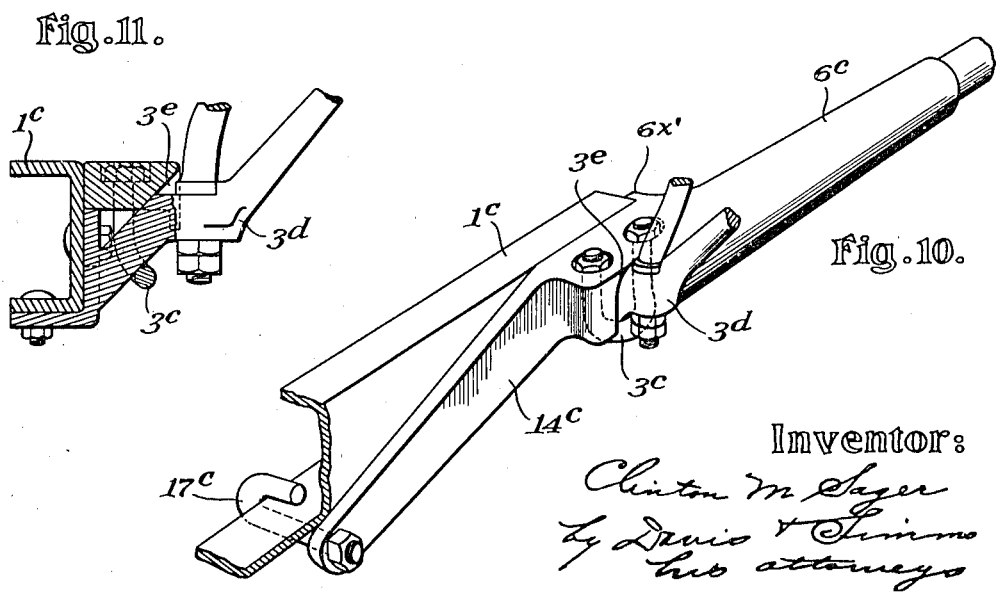

CLINTON M. SAGER, OF ROCHESTER, NEW YORK, ASSIGNOR TO J. H. SAGER COMPANY, OF ROCHESTER, NEW YORK, A CORPORATION.

CONNECTION BETWEEN AUTOMOBILE-BUMPERS AND VEHICLE-FRAMES.

1,274,456.     Specification of Letters Patent.    Patented Aug. 6, 1918.

Application filed April 13, 1917. Serial No. 161,694.

*To all whom it may concern:*

Be it known that I, CLINTON M. SAGER, a citizen of the United States, and resident of Rochester, in the county of Monroe and State of New York, have invented certain new and useful Improvements in Connections Between Automobile-Bumpers and Vehicle-Frames, of which the following is a specification.

The present invention relates to connections between the supporting arms of automobile bumpers and the side bars of vehicle frames, and an object thereof is to provide a construction which may be firmly engaged with the side bars without the necessity of perforating such bars, while at the same time permitting the supporting arms to lie in symmetrical positions with reference to the side bars.

To this and other ends, the invention consists of certain parts and combinations of parts all of which will be hereinafter described, the novel features being pointed out in the appended claims.

In the drawings:—

Figure 1 is a view, partially in section, showing the connection between one of the supporting arms of an automobile bumper and one of the side bars;

Fig. 2 is a plan view of the bumper supporting arm;

Fig. 3 is a section on the line 3—3, Fig. 2;

Fig. 4 is a view, similar to Fig. 1, of another embodiment of the invention;

Fig. 5 is a view, similar to Fig. 2, of the embodiment shown in Fig. 4;

Fig. 6 is a section on the line 6—6, Fig. 4;

Fig. 7 is a top view of an embodiment of the invention adapted for use on "Dodge" cars;

Fig. 8 is a side view of the embodiment shown in Fig. 7;

Fig. 9 is a section on the line 9—9, Fig. 7;

Fig. 10 is a perspective view of the invention adapted to "Ford" cars; and

Fig. 11 is a transverse vertical section of the embodiment shown in Fig. 10.

Referring more particularly to the drawings and to the embodiment shown in Figs. 1–3, 1 indicates the forward downwardly-curved end of a side bar of an automobile to which the springs 2 are connected by a bolt 3.

The bumper is of any suitable construction, and in this instance comprises a bar 4 supported by two supporting arms, only one being shown, each connected to one of the side bars of the automobile. Each supporting arm preferably comprises an outer section 5 guided in an inner section 6 at 7 and having a bolt 8 extending rearwardly therefrom through a chamber 9 in which a helical spring 10 is mounted, said spring bearing at one end against the outer section 5 and at the other end against the inner end wall of the chamber 9, the bolt being extended through the rear wall of the chamber and being held against turning by a shoulder 11 which coöperates with the head of the bolt.

The connection between each supporting arm and a side bar of the vehicle frame preferably comprises an abutment 12 curved to conform to the forward end of the bar 1 near one side of the latter, and is extended at 13 across the uppermost face of the bar to the opposite side of the latter. On this last named side a portion or extension 14 is provided which has a vertical abutting portion 15 for coöperating with the side face of the bar 1. This extension is provided, in proximity to the abutment 12, with an opening 16 through which the bolt 3 is passed in order to support the bumper arm at the forward end of the side bar 1. Near the rear end of this extension 14 means is provided for securing the bumper arm so as to hold the vertical abutting face in contact with the side face of the side bar 1. In this embodiment, this means comprises an extension 17 projecting beneath and engaging the under face of the side bar 1, and having a bolt opening 18 near its free end through which a bolt 19 passes, said bolt being employed for drawing a clamping jaw 20 into firm engagement with the upper face of the lower flange of the side bar 1.

The embodiment shown in Figs. 4–6 is substantially the same as that shown in Figs. 1–3, but differs therefrom in the means by which the rearward extension 14 is held in engagement with the vertical side face of the vehicle frame bar 1. Instead of having a projection on the extension 14 for engagement with the under side of the frame bar 1, a hooked bolt 17ᵃ is provided and has the hooked end engaging the lower flange of the side bar 1, while its other end passes through an opening 21 in the extension 14, being held therein by a nut 22.

The embodiment shown in Figs. 7, 8 and 9 is designed for what is commercially known as the "Dodge" car. In this car the side bar 1$^b$ is enlarged at X and bifurcated to receive the spring 2$^b$. In addition the bolt 3$^b$ has an oil cup 3$^x$ for oiling the connection between the spring 2$^b$ and the frame bar 1$^b$. The inner section 6$^b$ of the bumper supporting arm is provided with a lateral projection 6$^x$, the rear face 13$^b$ of which serves as an abutment for engaging the forward end of the vehicle frame bar 1$^b$. Preferably this abutment extends from a depending projection 6$^y$ on the inner member of the bumper arm and below the line of movement of the outer member 5$^b$ of said arm. This depending projection 6$^y$ has a vertical face which engages the side of the bar 1$^b$ about the bolt 3$^b$, said projection 6$^y$ having an opening through which the bolt is passed. By this arrangement, the oil cup 3$^x$ is accessible, and at the same time abutment with the front end and with the side of the frame bar 1$^b$ is secured. The portion of the inner bumper arm 6$^b$ which extends in rear of the abutment 6$^x$ is deflected inwardly at 6$^z$ to provide a portion 14$^b$ which has a vertical face for engaging the outer face of the side bar 1$^b$ in rear of the abutment 6$^x$. To the end that this portion 14$^b$ may be held firmly to the side bar, the portion 14$^b$ may be provided with an opening through which a hook bolt 17$^b$ is passed, said bolt having its hooked end engaging over the lower flange of the side bar.

The embodiment of the invention shown in Figs. 10 and 11 is designed for "Ford" cars in which the side bars do not have curved forward ends. In this construction, the arm 6$^c$ of the bumper has a lateral projection 6$^x$, the rear face of which forms an abutment for coöperating with the forward end of the frame bar 1$^c$. In the rear of this abutment, the member 6$^c$ has a portion 14$^c$ provided with a vertical face for coöperating with the outer side face of the frame bar 1$^c$. The rear portion of said portion 14$^c$ is extended downwardly, and is provided with an opening through which a hook bolt 17$^c$ is passed, the hook engaging with the lower flange of the side bar 1$^c$, as in the other embodiments. To secure the arm 6$^c$ to the side bar at a point immediately in the rear of the lateral projection 6$^x$, said rear portion is provided with two vertical openings with countersunk pockets about them through which the arms of a U-bolt or clip 3$^c$ are passed, said U-bolt passing about a bracket 3$^d$ which forms a support for a lamp and also for a mud-guard, this bracket being found in the Ford cars. To the end of fitting snugly about the bracket 3$^d$, the arm 6$^c$ is provided immediately in rear of said abutment 6$^x$ with a notch or recess 3$^e$, the top wall of which is inclined or slanting so as to coöperate with the top surface of the bracket 3$^d$ when the U-bolt 3$^c$ is tightened to draw the arm 6$^c$ in firm engagement with the bracket. The nuts on the bolt 3$^c$ are received within the countersunk pockets so that interference with the mud guards is eliminated.

In all illustrated embodiments of the invention the bumper supporting arm has an abutment which engages the forward end of the vehicle frame bar, and projecting in the rear of this abutment is an extension which coöperates or bears against the vertical side face of the frame bar and is held to the latter at two points, one in the immediate proximity to the abutment and the other at the end of the extension. Preferably the one in proximity to the abutment employs the bolt which connects the side bar with the spring of the vehicle, while the one at the rear end of the extension connects with the side bar without any perforation of the latter, and at the same time engages the under side of the side bar to prevent any tilting action about the bolt 3 as a pivot.

What I claim as my invention and desire to secure by Letters Patent is:—

1. The combination with a vehicle frame bar of channel form with the channel facing inwardly, of a bumper supporting arm having an abutment for coöperation with the end of the bar, and a portion extending in rear of said abutment and provided with a vertical abutment for coöperating with the side face of the bar, means for securing said portion to the bar in immediate proximity to the abutment with the front end of the bar, and a hooked clip near the free end of said portion extending under the bar and engaging about the lowermost flange of the latter for holding the vertical abutment in contact with the side face of the bar.

2. The combination with a vehicle frame bar of channel form having a curved forward end and the channel facing inwardly, a spring and a bolt connecting the spring to the frame bar, of a bumper supporting arm having an abutment engaging the forward end of the frame bar, and a portion extending in rear of said abutment and provided with a vertical face coöperating with the side of the frame bar, said portion having a horizontal bolt opening through which the bolt before mentioned passes, and a clip at the rear end of said portion extending under the frame bar and hooked about the lowermost flange for holding said vertical face in firm abutment with the frame bar.

3. The combination with a vehicle frame bar of channel form with the channel facing inwardly, the forward end of the bar being curved, of a bumper supporting arm having an abutment for coöperation with the end of the bar, and a rearwardly-extending portion formed with the vertical face coöperating with the side of the bar in rear of and in a plane above said abutment, said rearwardly-extending portion carrying means which extends laterally under the bar at the free end of said portion and engages about the lowermost flange of the bar, and means for securing the portion at a point between the abutment and said free end.

4. The combination with a vehicle frame bar of channel form with the channel facing inwardly, of a bumper supporting arm having an abutment for coöperation with the end of the bar, and a portion extending in rear of the abutment and having a vertical face for coöperating with the side of the frame bar, a bolt connecting the said portion to the vehicle frame bar adjacent to said abutment, and a clip on the free end of the rearwardly extending portion engaging about the lowermost flange of the frame bar and holding the rearwardly extending portion firm against the side face of the frame bar.

5. The combination with a vehicle frame bar of channel form with the channel facing inwardly; of a bumper supporting arm having a depending portion for coöperating with a vertical side face of the vehicle frame bar near the forward end of the latter, a lateral projection on said depending portion forming an abutment coöperating with the front end of said vehicle frame bar, and a portion extending rearwardly from said supporting arm; and a clip carried at the rear end of said portion and extending laterally therefrom about the lower flange of the vehicle frame bar.

6. The combination with a vehicle frame bar of channel form with the channel facing inwardly; a spring; and a bolt connecting said spring to the vehicle frame bar; of a bumper supporting arm having a depending portion provided with an opening through which said bolt passes to secure the bumper supporting arm to the vehicle, a lateral projection on the depending portion coöperating with the forward end of the vehicle frame bar, and a portion extending rearwardly from said abutting portion; and a hooked bolt carried by the rearwardly extending portion and extending laterally therefrom about the lower flange of the vehicle frame bar to secure the rear end of the bumper supporting arm.

7. The combination with a vehicle frame bar of channel form with the channel facing inwardly; a spring; and a bolt connecting the spring to the vehicle frame bar; of a bumper supporting arm having a depending portion engaging a vertical face of the vehicle frame bar and provided with an opening through which the bolt passes to secure the bumper supporting arm to the vehicle, a lateral projection on the depending portion engaging the forward end of the vehicle frame bar, and a portion extending rearwardly from the bumper supporting arm and having a vertical face for coöperating with the vertical side face of the vehicle frame bar; and a clip carried by said rearwardly extending portion and extending laterally therefrom under the frame bar to engage about the lowermost flange of said frame bar in order to secure the rear end of the bumper supporting arm to the frame bar.

CLINTON M. SAGER.